US009006918B2

(12) United States Patent
Casazza et al.

(10) Patent No.: US 9,006,918 B2
(45) Date of Patent: Apr. 14, 2015

(54) WIND TURBINE

(75) Inventors: Matteo Casazza, Val di Vizze (IT); Otto Pabst, Rio di Pusteria (IT); Alessandro Fasolo, Vipiteno (IT)

(73) Assignee: Wilic S.a.r.l., Luxembourg (LU)

( * ) Notice: Subject to any disclaimer, the term of this patent is extended or adjusted under 35 U.S.C. 154(b) by 501 days.

(21) Appl. No.: 13/415,603

(22) Filed: Mar. 8, 2012

(65) Prior Publication Data
US 2012/0248781 A1    Oct. 4, 2012

(30) Foreign Application Priority Data

Mar. 10, 2011  (IT) .............................. MI2011A0375

(51) Int. Cl.
| | |
|---|---|
| *F03D 9/00* | (2006.01) |
| *H02P 9/04* | (2006.01) |
| *H02K 1/27* | (2006.01) |
| *H02K 11/00* | (2006.01) |
| *H02K 1/22* | (2006.01) |
| *H02K 7/18* | (2006.01) |

(52) U.S. Cl.
CPC .............. *H02K 1/2773* (2013.01); *F03D 9/002* (2013.01); *F05B 2220/7066* (2013.01); *H02K 1/223* (2013.01); *H02K 1/2786* (2013.01); *H02K 7/1838* (2013.01); *H02K 11/0089* (2013.01); *Y02E 10/725* (2013.01)

(58) Field of Classification Search
USPC ..................................................... 290/44, 55
See application file for complete search history.

(56) References Cited

U.S. PATENT DOCUMENTS

| | | | |
|---|---|---|---|
| 1,894,357 | A | 1/1933 | Manikowske et al. |
| 1,948,854 | A | 2/1934 | Heath |
| 1,979,813 | A | 11/1934 | Reis |
| 2,006,172 | A | 6/1935 | Klappauf |
| 2,040,218 | A | 5/1936 | Soderberg |
| 2,177,801 | A | 10/1939 | Erren |
| 2,469,734 | A | 5/1949 | Ledwith |
| 2,496,897 | A | 2/1950 | Strickland |
| 2,655,611 | A | 10/1953 | Sherman |
| 2,739,253 | A | 3/1956 | Plumb |
| 2,806,160 | A | 9/1957 | Brainard |
| 2,842,214 | A | 7/1958 | Prewitt |
| 2,903,610 | A | 9/1959 | Bessiere |

(Continued)

FOREIGN PATENT DOCUMENTS

| | | |
|---|---|---|
| CA | 2404939 | 4/2004 |
| CA | 2518742 | 9/2004 |

(Continued)

OTHER PUBLICATIONS

Maxime R. Dubous, Henk Polinder, Study of TFPM Machines with Toothed Rotor Applied to Direct-Drive Generators for Wind Turbines, 2004.

(Continued)

*Primary Examiner* — Pedro J Cuevas
(74) *Attorney, Agent, or Firm* — Neal, Gerber & Eisenberg LLP

(57) ABSTRACT

A wind turbine having an electric machine in turn having a stator, and a rotor which rotates about an axis of rotation with respect to the stator; the rotor having a number of magnetized modules, and a number of supports for supporting the magnetized modules and arranged about the axis of rotation; and wherein at least two of the supports are parallel connected electrically.

26 Claims, 5 Drawing Sheets

(56) References Cited

U.S. PATENT DOCUMENTS

| | | |
|---|---|---|
| 3,004,782 A | 10/1961 | Meermans |
| 3,072,813 A | 1/1963 | Reijnst et al. |
| 3,083,311 A | 3/1963 | Krasnow |
| 3,131,942 A | 5/1964 | Ertaud |
| 3,168,686 A | 2/1965 | King et al. |
| 3,221,195 A | 11/1965 | Hoffmann |
| 3,363,910 A | 1/1968 | Toronchuk |
| 3,364,523 A | 1/1968 | Schippers |
| 3,392,910 A | 7/1968 | Tanzberger |
| 3,468,548 A | 9/1969 | Webb |
| 3,700,247 A | 10/1972 | Butler et al. |
| 3,724,861 A | 4/1973 | Lesiecki |
| 3,746,349 A | 7/1973 | Smale et al. |
| 3,748,089 A | 7/1973 | Boyer et al. |
| 3,789,252 A | 1/1974 | Abegg |
| 3,841,643 A | 10/1974 | McLean |
| 3,860,843 A | 1/1975 | Kawasaki et al. |
| 3,942,026 A | 3/1976 | Carter |
| 3,963,247 A | 6/1976 | Nommensen |
| 3,968,969 A | 7/1976 | Mayer et al. |
| 4,022,479 A | 5/1977 | Orlowski |
| 4,061,926 A | 12/1977 | Peed |
| 4,087,698 A | 5/1978 | Myers |
| 4,273,343 A | 6/1981 | Visser |
| 4,289,970 A | 9/1981 | Deibert |
| 4,291,235 A | 9/1981 | Bergey, Jr. et al. |
| 4,292,532 A | 9/1981 | Leroux |
| 4,336,649 A | 6/1982 | Glaser |
| 4,339,874 A | 7/1982 | Mc'Carty et al. |
| 4,348,604 A | 9/1982 | Thode |
| 4,350,897 A | 9/1982 | Benoit |
| 4,354,126 A | 10/1982 | Yates |
| 4,368,895 A | 1/1983 | Okamoto et al. |
| 4,398,773 A | 8/1983 | Boden et al. |
| 4,452,046 A | 6/1984 | Valentin |
| 4,482,831 A | 11/1984 | Notaras et al. |
| 4,490,093 A | 12/1984 | Chertok et al. |
| 4,517,483 A | 5/1985 | Hucker et al. |
| 4,517,484 A | 5/1985 | Dacier |
| 4,521,026 A | 6/1985 | Eide |
| 4,585,950 A | 4/1986 | Lund |
| 4,613,779 A | 9/1986 | Meyer |
| 4,638,200 A | 1/1987 | Le Corre et al. |
| 4,642,502 A * | 2/1987 | Carpenter et al. ....... 310/156.12 |
| 4,648,801 A | 3/1987 | Wilson |
| 4,694,654 A | 9/1987 | Kawamura |
| 4,700,096 A | 10/1987 | Epars |
| 4,714,852 A | 12/1987 | Kawada et al. |
| 4,720,640 A | 1/1988 | Anderson et al. |
| 4,722,661 A | 2/1988 | Mizuno |
| 4,724,348 A | 2/1988 | Stokes |
| 4,761,590 A | 8/1988 | Kaszman |
| 4,792,712 A | 12/1988 | Stokes |
| 4,801,244 A | 1/1989 | Stahl |
| 4,866,321 A | 9/1989 | Blanchard et al. |
| 4,900,965 A | 2/1990 | Fisher |
| 4,906,060 A | 3/1990 | Claude |
| 4,973,868 A | 11/1990 | Wust |
| 4,976,587 A | 12/1990 | Johnston et al. |
| 5,004,944 A | 4/1991 | Fisher |
| 5,063,318 A | 11/1991 | Anderson |
| 5,090,711 A | 2/1992 | Becker |
| 5,091,668 A | 2/1992 | Cuenot et al. |
| 5,177,388 A | 1/1993 | Hotta et al. |
| 5,191,255 A | 3/1993 | Kloosterhouse et al. |
| 5,275,139 A | 1/1994 | Rosenquist |
| 5,280,209 A | 1/1994 | Leupold et al. |
| 5,281,094 A | 1/1994 | McCarty et al. |
| 5,298,827 A | 3/1994 | Sugiyama |
| 5,302,876 A | 4/1994 | Iwamatsu et al. |
| 5,311,092 A | 5/1994 | Fisher |
| 5,315,159 A | 5/1994 | Gribnau |
| 5,331,238 A | 7/1994 | Johnsen |
| 5,410,997 A | 5/1995 | Rosenquist |
| 5,419,683 A | 5/1995 | Peace |
| 5,456,579 A | 10/1995 | Olson |
| 5,483,116 A | 1/1996 | Kusase et al. |
| 5,506,453 A | 4/1996 | McCombs |
| 5,579,800 A | 12/1996 | Walker |
| 5,609,184 A | 3/1997 | Apel et al. |
| 5,663,600 A | 9/1997 | Baek et al. |
| 5,670,838 A | 9/1997 | Everton |
| 5,696,419 A | 12/1997 | Rakestraw et al. |
| 5,704,567 A | 1/1998 | Maglieri |
| 5,746,576 A | 5/1998 | Bayly |
| 5,777,952 A | 7/1998 | Nishimura et al. |
| 5,783,894 A | 7/1998 | Wither |
| 5,793,144 A | 8/1998 | Kusase et al. |
| 5,798,632 A | 8/1998 | Muljadi |
| 5,801,470 A | 9/1998 | Johnson et al. |
| 5,811,908 A | 9/1998 | Iwata et al. |
| 5,814,914 A | 9/1998 | Caamaño |
| 5,844,333 A | 12/1998 | Sheerin |
| 5,844,341 A | 12/1998 | Spooner et al. |
| 5,857,762 A | 1/1999 | Schwaller |
| 5,886,441 A | 3/1999 | Uchida et al. |
| 5,889,346 A | 3/1999 | Uchida et al. |
| 5,894,183 A | 4/1999 | Borchert |
| 5,925,964 A | 7/1999 | Kusase et al. |
| 5,952,755 A | 9/1999 | Lubas |
| 5,961,124 A | 10/1999 | Muller |
| 5,973,435 A | 10/1999 | Irie et al. |
| 5,986,374 A | 11/1999 | Kawakami |
| 5,986,378 A | 11/1999 | Caamaño |
| 6,013,968 A | 1/2000 | Lechner et al. |
| 6,037,692 A | 3/2000 | Miekka et al. |
| 6,064,123 A | 5/2000 | Gislason |
| 6,067,227 A | 5/2000 | Katsui et al. |
| 6,089,536 A | 7/2000 | Watanabe et al. |
| 6,093,984 A | 7/2000 | Shiga et al. |
| 6,127,739 A | 10/2000 | Appa |
| 6,172,429 B1 | 1/2001 | Russell |
| 6,177,746 B1 | 1/2001 | Tupper et al. |
| 6,184,609 B1 * | 2/2001 | Johansson et al. ............ 310/328 |
| 6,193,211 B1 | 2/2001 | Watanabe et al. |
| 6,194,799 B1 | 2/2001 | Miekka et al. |
| 6,215,199 B1 | 4/2001 | Lysenko et al. |
| 6,232,673 B1 | 5/2001 | Schoo et al. |
| 6,278,197 B1 | 8/2001 | Appa |
| 6,278,206 B1 * | 8/2001 | Yockey et al. .................. 310/71 |
| 6,285,090 B1 | 9/2001 | Brutsaert et al. |
| 6,326,711 B1 | 12/2001 | Yamaguchi et al. |
| 6,365,994 B1 | 4/2002 | Watanabe et al. |
| 6,373,160 B1 | 4/2002 | Schrödl |
| 6,376,956 B1 | 4/2002 | Hosoya |
| 6,378,839 B2 | 4/2002 | Watanabe et al. |
| 6,380,656 B1 * | 4/2002 | Harris et al. .................. 310/239 |
| 6,384,504 B1 | 5/2002 | Elrhart et al. |
| 6,417,578 B1 | 7/2002 | Chapman et al. |
| 6,428,011 B1 | 8/2002 | Oskouei |
| 6,452,287 B1 | 9/2002 | Looker |
| 6,452,301 B1 | 9/2002 | Van Dine et al. |
| 6,455,976 B1 | 9/2002 | Nakano |
| 6,472,784 B2 | 10/2002 | Miekka et al. |
| 6,474,653 B1 | 11/2002 | Hintenlang et al. |
| 6,476,513 B1 | 11/2002 | Gueorguiev |
| 6,483,199 B2 | 11/2002 | Umemoto et al. |
| 6,492,743 B1 | 12/2002 | Appa |
| 6,492,754 B1 | 12/2002 | Weiglhofer et al. |
| 6,499,532 B1 | 12/2002 | Williams |
| 6,504,260 B1 | 1/2003 | Debleser |
| 6,515,390 B1 | 2/2003 | Lopatinsky et al. |
| 6,520,737 B1 | 2/2003 | Fischer et al. |
| 6,548,932 B1 | 4/2003 | Weiglhofer et al. |
| 6,590,312 B1 | 7/2003 | Seguchi et al. |
| 6,603,232 B2 | 8/2003 | Van Dine et al. |
| 6,617,747 B1 | 9/2003 | Petersen |
| 6,629,358 B2 | 10/2003 | Setiabudi et al. |
| 6,644,923 B1 * | 11/2003 | Fine et al. ..................... 416/183 |
| 6,664,692 B1 | 12/2003 | Kristoffersen |
| 6,676,122 B1 | 1/2004 | Wobben |
| 6,683,397 B2 | 1/2004 | Gauthier et al. |
| 6,700,260 B2 | 3/2004 | Hsu et al. |
| 6,700,288 B2 | 3/2004 | Smith |

(56) References Cited

U.S. PATENT DOCUMENTS

| | | |
|---|---|---|
| 6,707,224 B1 | 3/2004 | Petersen |
| 6,720,688 B1 | 4/2004 | Schiller |
| 6,727,624 B2 | 4/2004 | Morita et al. |
| 6,746,217 B2 | 6/2004 | Kim et al. |
| 6,759,758 B2 | 7/2004 | Martinez |
| 6,762,525 B1 | 7/2004 | Maslov et al. |
| 6,781,276 B1 | 8/2004 | Stiesdal et al. |
| 6,784,564 B1 | 8/2004 | Wobben |
| 6,794,781 B2 | 9/2004 | Razzell et al. |
| 6,800,956 B2 * | 10/2004 | Bartlett ............ 290/55 |
| 6,828,710 B1 | 12/2004 | Gabrys |
| 6,856,042 B1 | 2/2005 | Kubota |
| 6,879,075 B2 | 4/2005 | Calfo et al. |
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt et al. |
| 6,906,444 B2 | 6/2005 | Hattori et al. |
| 6,911,741 B2 | 6/2005 | Pettersen et al. |
| 6,919,654 B2 * | 7/2005 | Harned et al. ............ 310/12.01 |
| 6,921,243 B2 | 7/2005 | Canini et al. |
| 6,931,834 B1 | 8/2005 | Jones |
| 6,932,574 B2 | 8/2005 | Wobben |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt et al. |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | LaBath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes et al. |
| 7,042,109 B2 | 5/2006 | Gabrys |
| 7,057,305 B2 | 6/2006 | Krüger-Gotzmann et al. |
| 7,075,192 B2 | 7/2006 | Bywaters et al. |
| 7,081,696 B2 | 7/2006 | Ritchey |
| 7,088,024 B2 | 8/2006 | Agnes et al. |
| 7,091,642 B2 | 8/2006 | Agnes et al. |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,116,006 B2 | 10/2006 | McCoin |
| 7,119,469 B2 | 10/2006 | Ortt et al. |
| 7,154,191 B2 | 12/2006 | Jansen et al. |
| 7,161,260 B2 | 1/2007 | Krüger-Gotzmann et al. |
| 7,166,942 B2 | 1/2007 | Yokota |
| 7,168,248 B2 | 1/2007 | Sakamoto et al. |
| 7,168,251 B1 | 1/2007 | Janssen |
| 7,179,056 B2 | 2/2007 | Sieffriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,345,376 B2 | 3/2008 | Costin |
| 7,358,637 B2 | 4/2008 | Tapper |
| 7,377,163 B2 | 5/2008 | Miyagawa |
| 7,385,305 B2 | 6/2008 | Casazza et al. |
| 7,385,306 B2 | 6/2008 | Casazza et al. |
| 7,392,988 B2 | 7/2008 | Moldt et al. |
| 7,394,178 B1 * | 7/2008 | Hsiung et al. ............ 310/156.12 |
| 7,427,814 B2 | 9/2008 | Bagepalli et al. |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,550,863 B2 | 6/2009 | Versteegh |
| 7,594,800 B2 | 9/2009 | Teipen |
| 7,679,260 B2 * | 3/2010 | Yamamoto et al. ............ 310/268 |
| 7,687,932 B2 | 3/2010 | Casazza et al. |
| 8,222,792 B2 * | 7/2012 | Platon et al. ............ 310/266 |
| 8,358,046 B2 * | 1/2013 | Platon ............ 310/266 |
| 8,358,189 B2 * | 1/2013 | Kaessner et al. ............ 335/284 |
| 8,575,817 B2 * | 11/2013 | Platon et al. ............ 310/266 |
| 8,581,464 B2 * | 11/2013 | Lokhandwalla et al. 310/156.12 |
| 8,810,347 B2 * | 8/2014 | Kaessner et al. ............ 335/284 |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0089251 A1 | 7/2002 | Tajima et al. |
| 2002/0148453 A1 | 10/2002 | Watanabe et al. |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0141721 A1 * | 7/2003 | Bartlett ............ 290/55 |
| 2003/0230899 A1 | 12/2003 | Martinez |
| 2004/0066098 A1 | 4/2004 | Doherty et al. |
| 2004/0080230 A1 | 4/2004 | Shah et al. ............ 310/179 |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |
| 2004/0151575 A1 | 8/2004 | Pierce et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0002787 A1 | 1/2005 | Wobben |
| 2005/0082836 A1 | 4/2005 | Lagerwey |
| 2005/0082839 A1 | 4/2005 | McCoin |
| 2005/0230979 A1 | 10/2005 | Bywaters et al. |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0116567 A1 | 5/2007 | Luetze |
| 2007/0187954 A1 | 8/2007 | Struve et al. |
| 2007/0187956 A1 | 8/2007 | Wobben |
| 2007/0222223 A1 | 9/2007 | Bagepalli et al. |
| 2007/0222226 A1 | 9/2007 | Casazza et al. |
| 2007/0222227 A1 | 9/2007 | Casazza et al. |
| 2008/0003105 A1 | 1/2008 | Nies |
| 2008/0025847 A1 | 1/2008 | Teipen |
| 2008/0050234 A1 | 2/2008 | Ingersoll et al. |
| 2008/0107526 A1 | 5/2008 | Wobben |
| 2008/0118342 A1 | 5/2008 | Seidel et al. |
| 2008/0197636 A1 | 8/2008 | Tilscher et al. |
| 2008/0197638 A1 | 8/2008 | Wobben |
| 2008/0246224 A1 | 10/2008 | Pabst et al. |
| 2008/0290664 A1 | 11/2008 | Kruger |
| 2008/0303281 A1 | 12/2008 | Krueger |
| 2008/0309189 A1 | 12/2008 | Pabst et al. |
| 2008/0315594 A1 | 12/2008 | Casazza et al. |
| 2009/0045628 A1 | 2/2009 | Erdman et al. |
| 2009/0060748 A1 | 3/2009 | Landa et al. |
| 2009/0094981 A1 | 4/2009 | Eggleston |
| 2009/0096309 A1 | 4/2009 | Pabst et al. |

(56) References Cited

U.S. PATENT DOCUMENTS

| | | | |
|---|---|---|---|
| 2009/0302702 A1 | 12/2009 | Pabst et al. | |
| 2010/0007225 A1* | 1/2010 | Platon et al. | 310/45 |
| 2010/0019502 A1 | 1/2010 | Pabst et al. | |
| 2010/0026010 A1 | 2/2010 | Pabst | |
| 2010/0117362 A1 | 5/2010 | Vihriala et al. | |
| 2010/0123318 A1 | 5/2010 | Casazza et al. | |
| 2011/0030419 A1 | 2/2011 | Kikuschi et al. | 62/498 |
| 2011/0187218 A1* | 8/2011 | Kaessner et al. | 310/156.01 |
| 2011/0266909 A1* | 11/2011 | Lokhandwalla et al. | 310/156.12 |
| 2012/0112466 A1* | 5/2012 | Junge et al. | 290/55 |
| 2012/0133230 A1* | 5/2012 | Jansen | 310/156.12 |
| 2012/0181792 A1* | 7/2012 | Pettersen et al. | 290/55 |
| 2012/0248780 A1* | 10/2012 | Casazza et al. | 290/55 |
| 2012/0262023 A1* | 10/2012 | Platon et al. | 310/195 |
| 2013/0062975 A1* | 3/2013 | Pabst et al. | 310/59 |
| 2013/0214541 A1* | 8/2013 | Kamper et al. | 290/55 |
| 2013/0300227 A1* | 11/2013 | Pabst et al. | 310/53 |
| 2014/0028138 A1* | 1/2014 | Feher et al. | 310/156.08 |
| 2014/0054897 A1* | 2/2014 | Casazza et al. | 290/55 |
| 2014/0062231 A1* | 3/2014 | Casazza et al. | 310/59 |
| 2014/0356162 A1* | 12/2014 | Fasolo et al. | 416/1 |

FOREIGN PATENT DOCUMENTS

| | | |
|---|---|---|
| CN | 1554867 | 12/2004 |
| DE | 1130913 | 6/1962 |
| DE | 2164135 | 7/1973 |
| DE | 2322458 | 11/1974 |
| DE | 2506160 | 8/1976 |
| DE | 2922885 | 12/1980 |
| DE | 3638129 | 5/1988 |
| DE | 3718954 | 12/1988 |
| DE | 3844505 | 7/1990 |
| DE | 3903399 | 8/1990 |
| DE | 4304577 | 8/1994 |
| DE | 4402184 | 8/1995 |
| DE | 4415570 | 11/1995 |
| DE | 4436290 | 5/1996 |
| DE | 4444757 | 6/1996 |
| DE | 4445899 | 6/1996 |
| DE | 19501267 | 8/1996 |
| DE | 29706980 | 7/1997 |
| DE | 19636591 | 3/1998 |
| DE | 19644355 | 4/1998 |
| DE | 19652673 | 6/1998 |
| DE | 19711869 | 9/1998 |
| DE | 19748716 | 11/1998 |
| DE | 29819391 | 2/1999 |
| DE | 19801803 | 4/1999 |
| DE | 19826086 | 12/1999 |
| DE | 19932394 | 1/2001 |
| DE | 19947915 | 4/2001 |
| DE | 19951594 | 5/2001 |
| DE | 10000370 | 7/2001 |
| DE | 20102029 | 8/2001 |
| DE | 10219190 | 11/2003 |
| DE | 10246690 | 4/2004 |
| DE | 102004018524 | 11/2005 |
| DE | 102004028746 | 12/2005 |
| DE | 102007042338 | 3/2009 |
| DE | 10 2009 025 929 | 12/2010 |
| EP | 0013157 | 7/1980 |
| EP | 0232963 | 8/1987 |
| EP | 0313392 | 4/1989 |
| EP | 0627805 | 12/1994 |
| EP | 0 998 010 | 5/2000 |
| EP | 1108888 | 6/2001 |
| EP | 1167754 | 1/2002 |
| EP | 1289097 | 3/2003 |
| EP | 1291521 | 3/2003 |
| EP | 1425840 | 3/2003 |
| EP | 1309067 | 5/2003 |
| EP | 1363019 | 11/2003 |
| EP | 1375913 | 1/2004 |
| EP | 1394406 | 3/2004 |
| EP | 1394451 | 3/2004 |
| EP | 2063117 | 5/2005 |
| EP | 1568883 | 8/2005 |
| EP | 1589222 | 10/2005 |
| EP | 1612415 | 1/2006 |
| EP | 1641102 | 3/2006 |
| EP | 1792381 | 3/2006 |
| EP | 1677002 | 7/2006 |
| EP | 1772624 | 4/2007 |
| EP | 1780409 | 5/2007 |
| EP | 1788241 | 5/2007 |
| EP | 1829762 | 9/2007 |
| EP | 1881194 | 1/2008 |
| EP | 1921311 | 5/2008 |
| EP | 2102496 | 7/2008 |
| EP | 2060786 | 5/2009 |
| EP | 2063115 | 5/2009 |
| EP | 2063116 | 5/2009 |
| EP | 2143842 | 1/2010 |
| EP | 2143938 | 1/2010 |
| EP | 2143944 | 1/2010 |
| EP | 2 282 397 | 2/2011 |
| ES | 2140301 | 2/2000 |
| ES | 2 233 146 | 6/2005 |
| FR | 806292 | 12/1936 |
| FR | 859844 | 12/1940 |
| FR | 1348765 | 1/1964 |
| FR | 2401091 | 3/1979 |
| FR | 2445053 | 7/1980 |
| FR | 2519483 | 7/1983 |
| FR | 2594272 | 8/1987 |
| FR | 2613148 | 3/1988 |
| FR | 2760492 | 9/1998 |
| FR | 2796671 | 1/2001 |
| FR | 2798168 | 3/2001 |
| FR | 2810374 | 12/2001 |
| FR | 2882404 | 8/2006 |
| GB | 17268 | 0/1914 |
| GB | 859176 | 1/1961 |
| GB | 1524477 | 9/1978 |
| GB | 1537729 | 1/1979 |
| GB | 2041111 | 9/1980 |
| GB | 2050525 | 1/1981 |
| GB | 2075274 | 11/1981 |
| GB | 2131630 | 6/1984 |
| GB | 2144587 | 3/1985 |
| GB | 2208243 | 3/1989 |
| GB | 2266937 | 11/1993 |
| GB | 2372783 | 9/2002 |
| JP | 56081053 | 7/1981 |
| JP | 57059462 | 4/1982 |
| JP | 3145945 | 6/1991 |
| JP | 5122912 | 5/1993 |
| JP | 6002970 | 1/1994 |
| JP | 6269141 | 9/1994 |
| JP | 10-070858 | 3/1998 |
| JP | 11236977 | 8/1999 |
| JP | 11-299197 | 10/1999 |
| JP | 2000-134885 | 5/2000 |
| JP | 2001-057750 | 2/2001 |
| JP | 2003453072 | 7/2003 |
| JP | 2004-153913 | 5/2004 |
| JP | 2004-297947 | 10/2004 |
| JP | 2005-006375 | 1/2005 |
| JP | 2005-020906 | 1/2005 |
| JP | 2005-312150 | 11/2005 |
| NL | 8902534 | 5/1991 |
| RU | 2000466 | 9/1993 |
| RU | 2229621 | 5/2004 |
| WO | WO8402382 | 6/1984 |
| WO | WO9105953 | 5/1991 |
| WO | WO9212343 | 7/1992 |
| WO | WO9607825 | 3/1996 |
| WO | WO9730504 | 8/1997 |
| WO | WO9733357 | 9/1997 |
| WO | WO9840627 | 9/1998 |
| WO | WO9930031 | 6/1999 |
| WO | WO9933165 | 7/1999 |

(56) References Cited

FOREIGN PATENT DOCUMENTS

| | | |
|---|---|---|
| WO | WO9937912 | 7/1999 |
| WO | WO9939426 | 8/1999 |
| WO | WO0001056 | 1/2000 |
| WO | WO0014405 | 3/2000 |
| WO | WO0106121 | 1/2001 |
| WO | WO0106623 | 1/2001 |
| WO | WO0107784 | 2/2001 |
| WO | WO0121956 | 3/2001 |
| WO | WO0125631 | 4/2001 |
| WO | WO0129413 | 4/2001 |
| WO | WO0134973 | 5/2001 |
| WO | WO0135517 | 5/2001 |
| WO | WO0169754 | 9/2001 |
| WO | WO0233254 | 4/2002 |
| WO | WO02057624 | 7/2002 |
| WO | WO02083523 | 10/2002 |
| WO | WO03036084 | 5/2003 |
| WO | WO03067081 | 8/2003 |
| WO | WO03076801 | 9/2003 |
| WO | WO2004017497 | 2/2004 |
| WO | WO2004042227 | 5/2004 |
| WO | WO2004044419 | 5/2004 |
| WO | WO2005050008 | 6/2005 |
| WO | WO2005103489 | 11/2005 |
| WO | WO2006013722 | 2/2006 |
| WO | WO2006032515 | 3/2006 |
| WO | WO 2007/063370 A1 | 6/2007 |
| WO | WO2007063370 | 6/2007 |
| WO | WO2007110718 | 10/2007 |
| WO | WO2008052562 | 5/2008 |
| WO | WO2008086608 | 7/2008 |
| WO | WO2008098573 | 8/2008 |
| WO | WO2008102184 | 8/2008 |
| WO | WO2008116463 | 10/2008 |
| WO | WO2008131766 | 11/2008 |

OTHER PUBLICATIONS

Variable Speed Gearless Wind Turbine (website), http://www.mhi.cojp/msmw/mw/en/gearless.html, viewed on Sep. 22, 2006.
International Search Report for Italian Application No. MI20110375 dated Jan. 25, 2012.
Intellectual Property Office of New Zealand Examination Report dated Mar. 15, 2012 for Patent Application No. 598690.

* cited by examiner

WIND TURBINE

PRIORITY CLAIM

This application claims the benefit of and priority to Italian Patent Application No. MI2011A 000375, filed on Mar. 10, 2011, the entire contents of which are incorporated by reference herein.

BACKGROUND

Known wind turbines include a stator comprising a stator cylinder; and stator segments arranged about the axis of rotation, along the stator cylinder.

Known wind turbines also include a rotor comprising a rotor cylinder; and rotor segments arranged about the axis of rotation, along the rotor cylinder. Each rotor segment comprises a support extending parallel to the axis of rotation; and magnetized modules arranged, parallel to the axis of rotation, inside the support. The rotor segments are fitted to the rotor cylinder, and the stator segments to the stator cylinder. The rotor cylinder is connected to the stator cylinder by at least one bearing, and is connected to a hub and to a number of blades arranged about the hub.

Wind turbines of this type have proved highly efficient and easy to produce and install, but part of the energy transmitted from the blades to the electric machine has been found to be dispersed in so-called electromagnetic losses, particularly in the rotor.

In addition, the dispersed energy causes overheating of the rotor.

SUMMARY

The present disclosure relates to a wind turbine for producing electric energy.

More specifically, the present disclosure relates to a wind turbine comprising an electric machine having a stator, and a rotor which rotates about an axis of rotation with respect to the stator.

It is an object of the present disclosure to provide a wind turbine configured to limit certain of the drawbacks of known wind turbines.

Another object of the present disclosure is to provide a wind turbine configured to reduce electromagnetic losses with respect to certain known wind turbines.

Another object of the present disclosure is to provide a wind turbine configured to reduce overheating of the rotor.

According to the present disclosure, there is provided a wind turbine comprising an electric machine, in turn comprising a stator, and a rotor which rotates about an axis of rotation with respect to the stator; the rotor comprising a quantity or number of magnetized modules, and a quantity or number of supports for supporting the magnetized modules and arranged about the axis of rotation; and wherein at least two of the supports are parallel connected electrically.

Parallel electric connection of the supports reduces the parasitic currents induced by the magnetomotive force harmonics of the stator, thus reducing losses in the rotor and improving efficiency of the wind turbine. Reducing losses also reduces overheating of the rotor, which can therefore be cooled using relatively small, lightweight cooling components.

In one embodiment of the present disclosure, the wind turbine comprises an electric conducting structure for parallel connecting electrically at least two of the supports.

Additional features and advantages are described in, and will be apparent from, the following Detailed Description and the figures.

BRIEF DESCRIPTION OF THE DRAWINGS

A number of non-limiting embodiments of the present disclosure will be described by way of example with reference to the accompanying drawings, in which.

DETAILED DESCRIPTION

Figure 1:
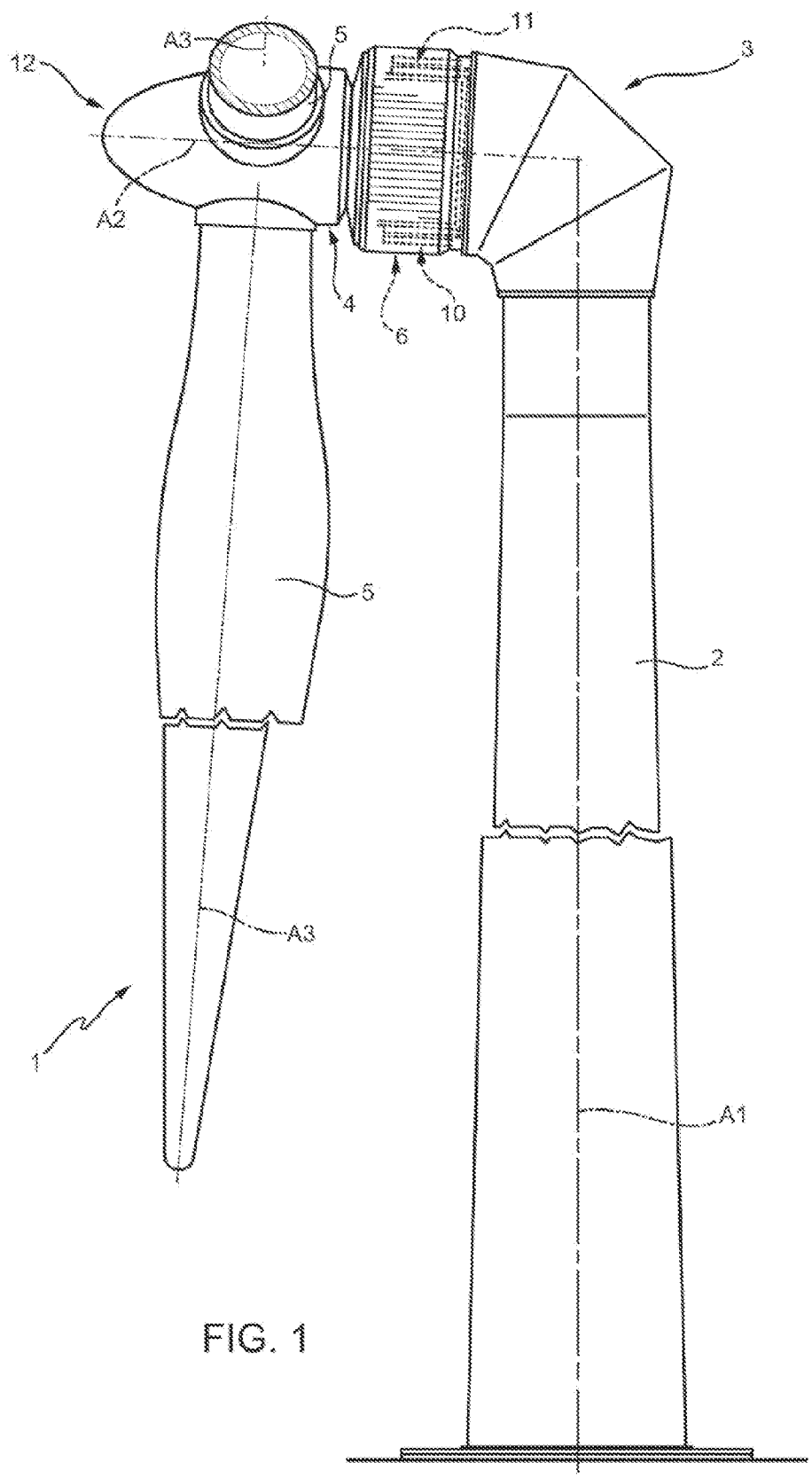
FIG. 1 shows a side view, with parts removed for clarity, of a wind turbine in accordance with the present disclosure.

Referring now to the example embodiments of the present disclosure illustrated in FIGS. 1 to 5, number 1 in FIG. 1 indicates as a whole a wind turbine for producing electric energy.

In the FIG. 1 example, wind turbine 1 is a direct-drive, variable-angular-speed type, and comprises a supporting structure 2, a nacelle 3, a hub 4, three blades 5 (only two shown in FIG. 1), and a multiphase electric machine 6. Blades 5 are fitted to hub 4, which in turn is fitted to nacelle 3, in turn fitted to supporting structure 2, which is a structural member supporting nacelle 3.

In a variation of the present disclosure (not shown), supporting structure 2 is a pylon, such as made of ferrous material.

With reference to FIG. 1, nacelle 3 is mounted to rotate about an axis A1 with respect to supporting structure 2, to position blades 5 facing the wind; hub 4 is mounted to rotate about an axis of rotation A2 with respect to nacelle 3; each blade 5 is fitted to hub 4 to rotate about an axis A3 with respect to hub 4; electric machine 6 comprises a stator 10, and a rotor 11 which rotates with respect to stator 10 about axis of rotation A2; and hub 4, blades 5, and rotor 11 define a rotary assembly 12, which rotates with respect to nacelle 3 about axis of rotation A2.

Figure 2:
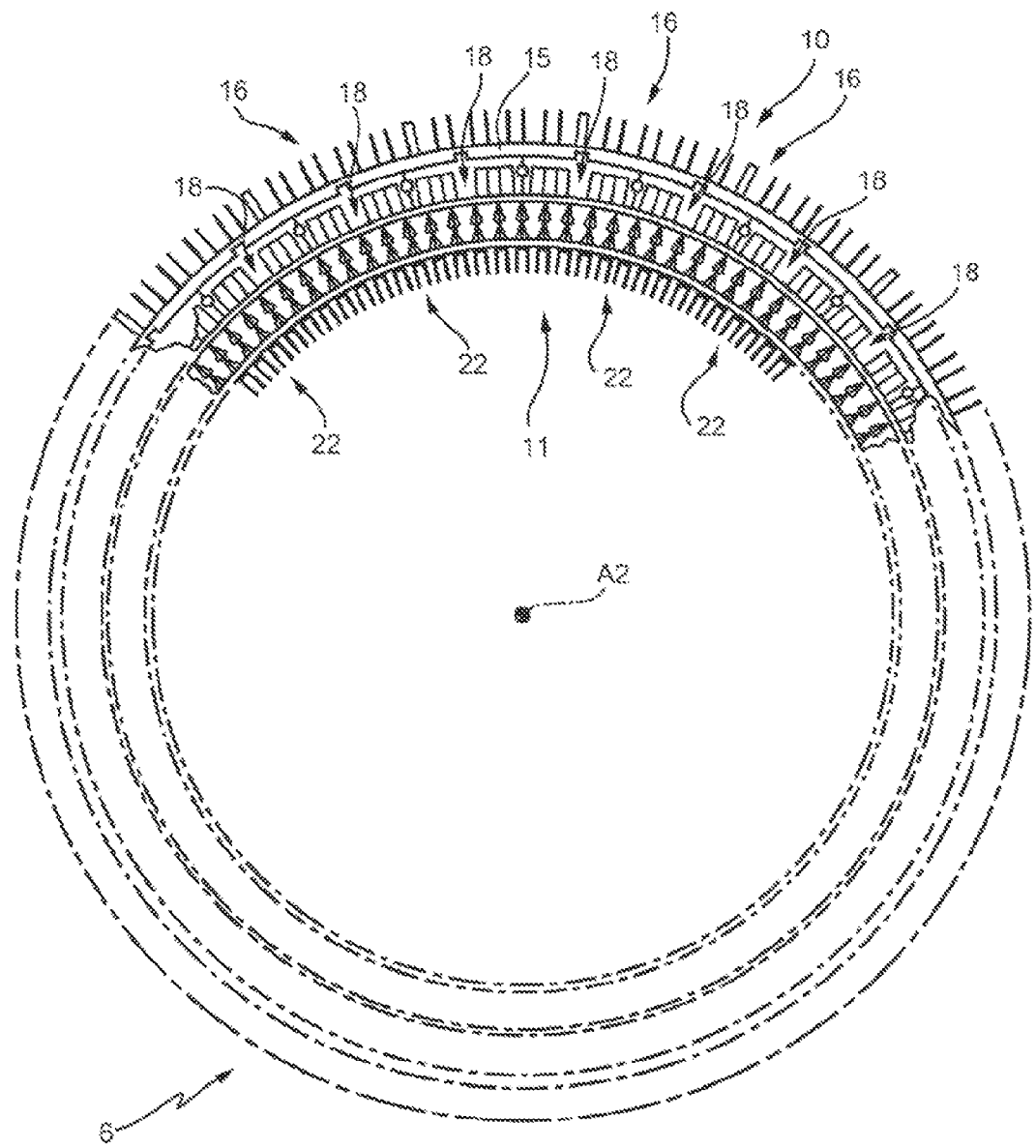
FIG. 2 shows a schematic front view, with parts removed for clarity, of an electric machine of the FIG. 1 wind turbine.
Figure 3:
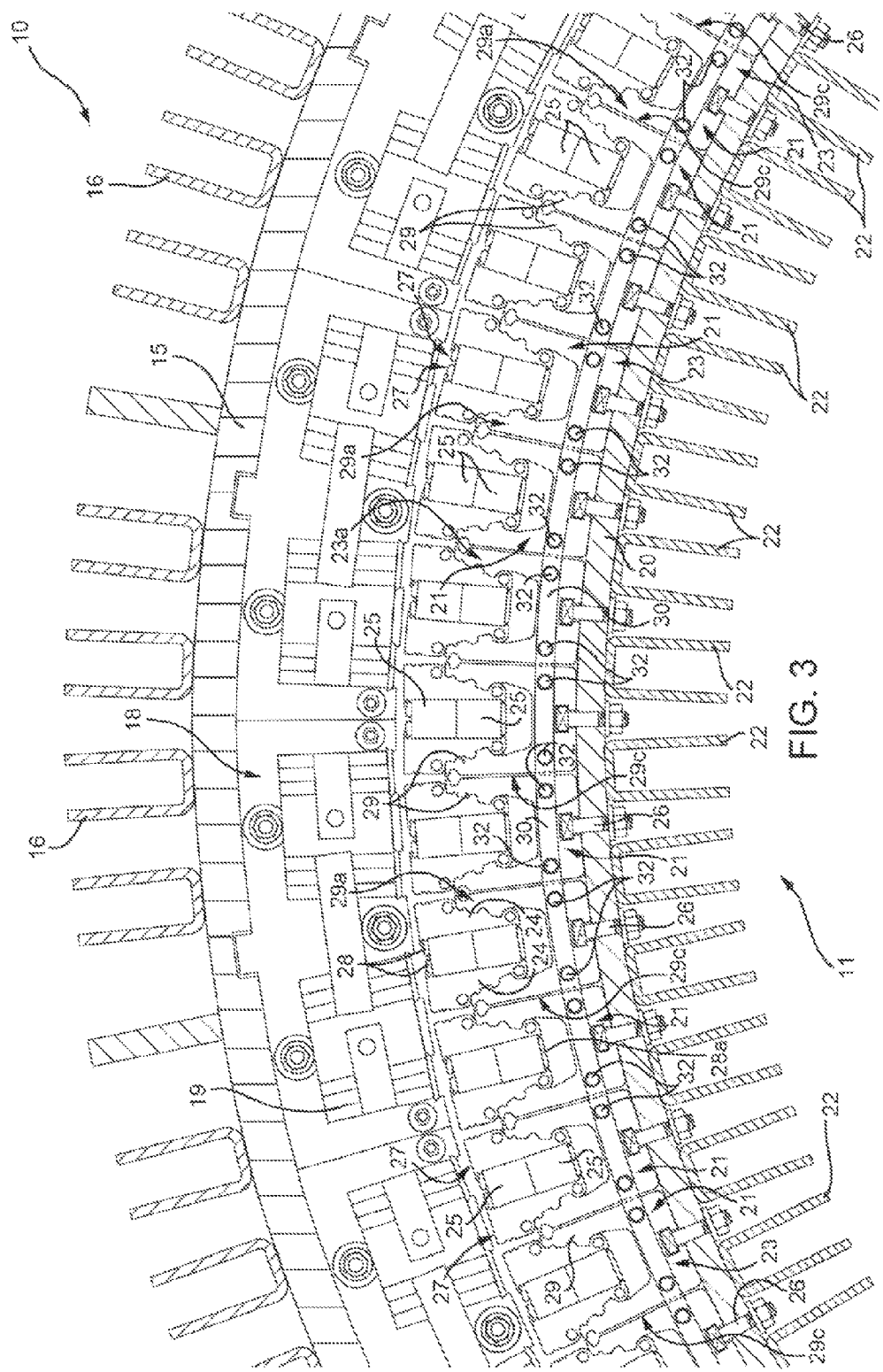
FIG. 3 shows a larger-scale side view, with parts removed for clarity, of a detail of the FIG. 2 electric machine.

With reference to FIGS. 2 and 3, stator 10 comprises a stator cylinder 15; cooling fins 16 fixed to the outer face of stator cylinder 15; and a quantity or number of stator segments 18 arranged about axis of rotation A2 and fixed to the inner face of stator cylinder 15 by fasteners (not shown in the drawings). Cooling fins 16 serve to cool stator cylinder 15 and therefore stator 10. More specifically, cooling fins 16 and stator cylinder 15 are made of heat-conducting material, so the heat produced inside stator 10, by Joule effect or otherwise, is transferred to stator cylinder 15 and from this to cooling fins 16 configured to dissipate the produced heat. Each stator segment 18 comprises windings, and packs of stator laminations 19 wound with a winding, which is associated with one stator segment 18, so the stator segment can be extracted from stator 10 without interfering with the other stator segments 18. Stator cylinder 15 covers, protects and supports stator segments 18.

With reference to FIGS. 2 and 3, rotor 11 comprises a rotor cylinder 20, rotor segments 21 arranged about axis of rotation A2 (FIG. 2), and cooling fins 22 fixed to the inner face of rotor cylinder 20. Rotor cylinder 20 is hollow to allow worker access to the inside for maintenance, and to allow access through the rotor cylinder from nacelle 3 to hub 4, which is also hollow. Rotor cylinder 20 in the drawings has a circular cross section, but the protective scope of the present disclosure extends to cylinders of any cross section (e.g., square, rectangular, etc). Cooling fins 22 cool rotor cylinder 20 and therefore rotor 11, and are made, as is rotor cylinder 20, of heat-conducting material, so the heat produced inside rotor 11 is transferred to rotor cylinder 20 and from this to cooling fins 22 configured to dissipate the produced heat.

Figure 4:
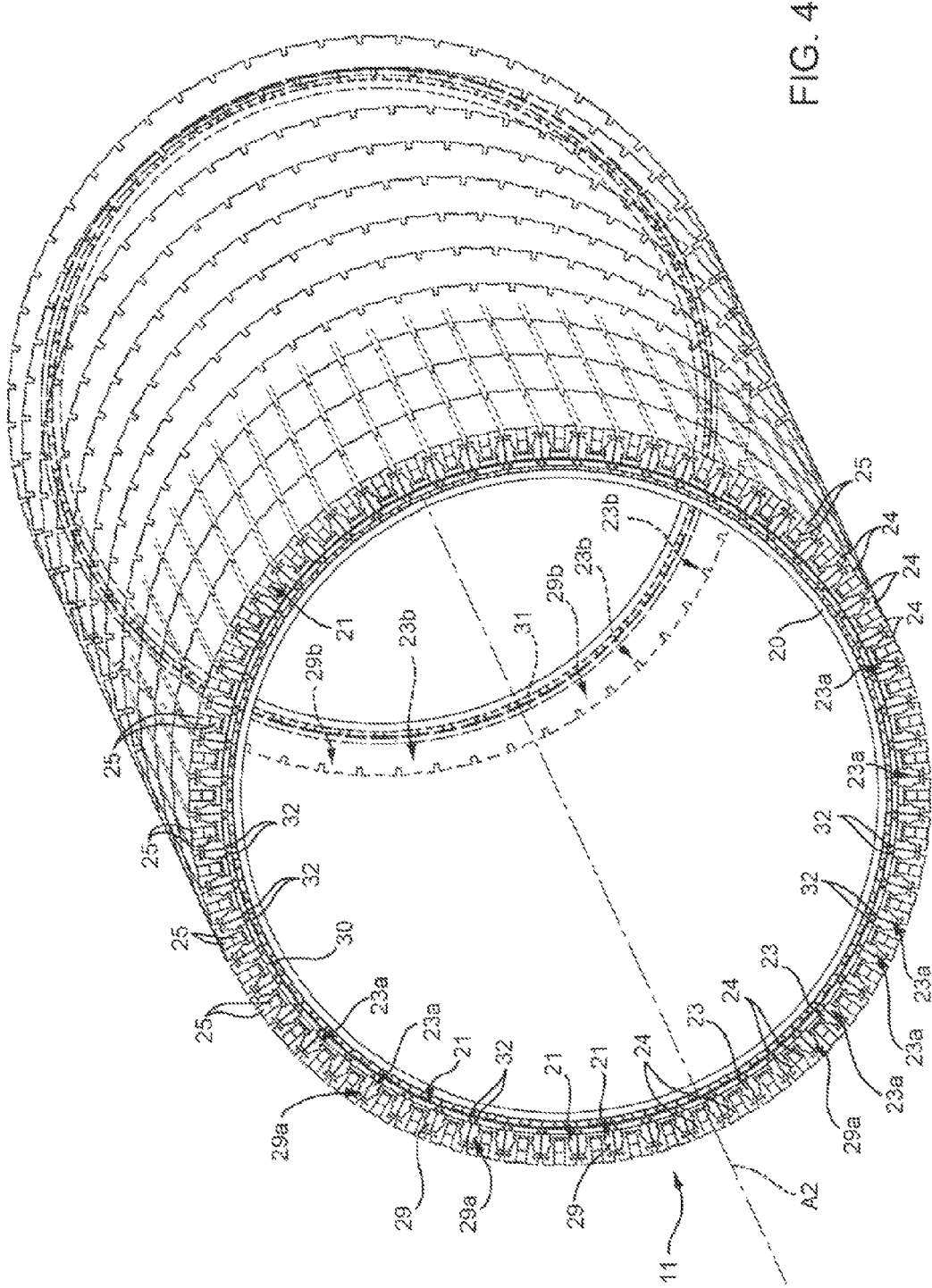
FIG. 4 shows a view in perspective, with parts removed for clarity, of a detail of the FIG. 2 electric machine.

With reference to FIGS. 3 and 4, each rotor segment 21 comprises a support 23, magnetic guides 24, magnetized modules 25, and bolts 26. More specifically, support 23 extends, parallel to axis of rotation A2, from an end 23a to an end 23b (FIG. 4), and is fixed to rotor cylinder 20 of rotor 11 by bolts 26. Magnetized modules 25 of each rotor segment 21 are aligned radially to axis of rotation A2 (FIG. 2) to form groups of modules 25, which in turn are arranged successively, parallel to axis of rotation A2 (FIG. 2), along the whole of rotor segment 21.

With particular reference to FIGS. 2, 3 and 4, each group of modules 25 comprises two modules 25 aligned radially to axis of rotation A2; and, by way of a non-limiting example, each rotor segment 21 comprises eleven groups of modules 25 (FIG. 4) arranged successively, parallel to axis of rotation A2. Each group of modules 25 is located between a respective pair of magnetic guides 24, each defined by respective packs of laminations, so each rotor segment 21 comprises eleven pairs of magnetic guides 24. Each pair of magnetic guides 24 is located inside support 23 fixed to rotor cylinder 20 by bolts 26, has two faces 27, and is traversed, in use, by the magnetic flux produced by magnetized modules 25, and defines the field lines. Each group of modules 25 between magnetic guides 24 is protected by two insulating protectors 28 on the top end, and by an insulating protector 28a on the bottom end.

With reference to FIGS. 3 and 4, support 23 comprises a gripper 29 extending, parallel to axis of rotation A2, from an end 29a to an end 29b, and fixed to cylinder 20 of rotor 11 by bolts 26.

Each gripper 29 has two lateral faces 29c, each facing a lateral face 29c of the adjacent gripper 29; and grippers 29 are processed to electrically insulate lateral faces 29c to prevent electric charges from travelling through lateral faces 29c of contiguous grippers 29.

With reference to FIGS. 3 and 4, rotor 11 comprises two annular electric conductors 30 and 31 for parallel connecting grippers 29 electrically. Electric conductor 30 is fixed to end 29a of each gripper 29 by two fasteners 32, and electric conductor 31 is fixed to end 29b of each gripper 29 by two fasteners 32, so grippers 29 are parallel connected electrically.

Grippers 29 are processed to reduce the surface electric resistance of ends 29a and 29b, which thus form excellent electric contacts.

More specifically, electric conductors 30 and 31 are connected by fasteners 32 to ends 29a and 29b of each gripper 29 to ensure optimum electric connection of gripper 29 to electric conductor 30 by virtue of the low surface resistance of ends 29a and 29b.

In an alternative embodiment of the present disclosure, wind turbine 1 comprises electrically conducting (e.g., silver) paste between ends 29a, 29b and respective conductors 30, 31 to improve electric connection.

In actual use, electric conductors 30 and 31 are traversed by parasitic currents induced by the magnetomotive force harmonics of stator 10, and are configured accordingly, on the basis of the amplitude of the parasitic currents.

Electric conductors 30 and 31 define an electric conducting structure.

In one embodiment of the present disclosure, electric conductors 30 and 31 are made of copper.

In another embodiment of the present disclosure, electric conductors 30 and 31 are made of nonmagnetic conducting material, such as aluminum or stainless steel.

Figure 5:
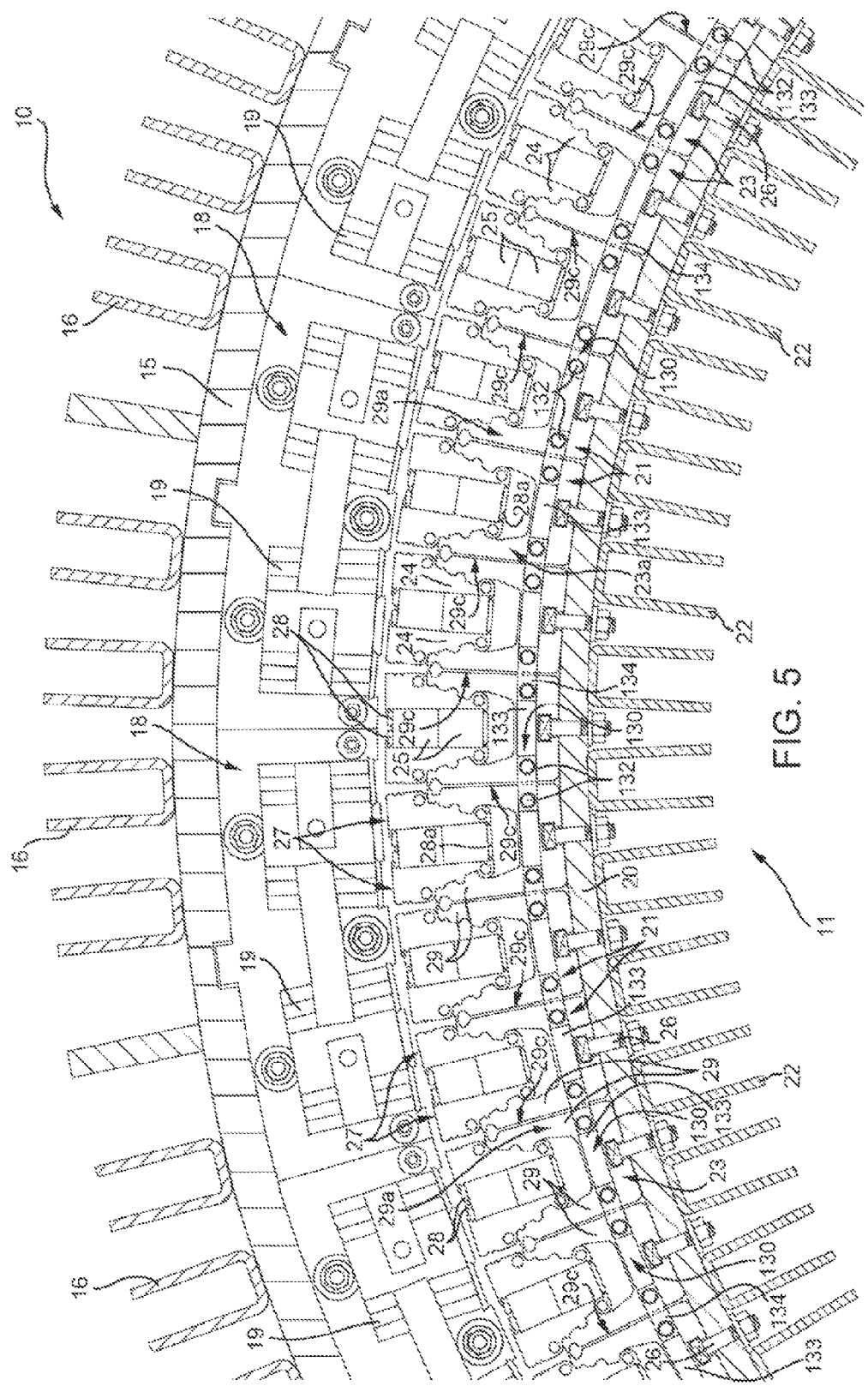
FIG. 5 shows a larger-scale side view, with parts removed for clarity, of an alternative embodiment of the FIGS. 2 and 3 electric machine.

In an alternative embodiment of the present disclosure shown in FIG. 5, electric conductors 30 and 31 are replaced with two groups of electric conducting elements 130 (only one shown in FIG. 5). One group of electric conducting elements 130 is associated with ends 29a, and the other with ends 29b of grippers 29; and, for each gripper 29, each group of electric conducting elements 130 comprises an electric conductor 133 facing respective end 29a, 29b of respective gripper 29. Electric conductors 133 extend the full length of, and are positioned contacting, respective end 29a, 29b of respective gripper 29. And the low surface electric resistance of ends 29a and 29b provides for excellent electric connection between gripper 29 and electric conductor 133.

Each group of electric conducting elements 130 also comprises electric conductors 134 for electrically connecting adjacent grippers 29. More specifically, each electric conductor 134 is located between two adjacent grippers 29, and positioned contacting respective electric conductors 133 of adjacent grippers 29. Electric conductors 133 and 134 are fixed to respective grippers 29 by fasteners 132 configured to fix electric conductors 133 to respective gripper 29, and electric conductors 134 to respective electric conductors 133.

The two groups of electric conducting elements 130 are configured on the basis of the amplitude of the parasitic currents.

In an alternative embodiment of the present disclosure, wind turbine 1 comprises electrically conducting paste between ends 29a, 29b and respective electric conductors 133 to improve electric connection.

The two groups of electric conducting elements 130 define an annular electric conducting structure.

In one embodiment of the present disclosure, groups of electric conducting elements 130 are made of copper.

In another embodiment of the present disclosure, groups of electric conducting elements 130 are made of nonmagnetic conducting material, such as aluminum or stainless steel.

The two groups of electric conducting elements 130 allow easier access to grippers 29 for maintenance. In other words, each gripper 29 can be extracted from rotor cylinder 20 by simply removing the two electric conductors 134 and electric conductor 133 fixed to ends 29a, 29b of gripper 29, thus enabling faster, easier maintenance and access to grippers 29.

The two conductors 30, 31 or groups of electric conducting elements 130 ensure parallel electric connection of grippers 29 and therefore electric paths for the electric charges generated on grippers 29 by the electromagnetic field of stator 10. In other words, grippers 29 and conductors 30, 31 or the two groups of electric conducting elements 130 form an electric circuit in which grippers 29 represent parallel-connected impedances.

Parallel electric connection of supports 23 reduces the parasitic currents induced by the magnetomotive force harmonics of stator 10, thus reducing losses in rotor 11 and improving the efficiency of wind turbine 1. Reducing losses also reduces overheating of rotor 11, thus enabling use of relatively small cooling fins 22.

In an alternative embodiment of the present disclosure, rotor cylinder 20 and cooling fins 22 are made of nonmagnetic material, such as stainless steel, aluminum, or heat-conducting polymer material.

It should be appreciated that the electric machine 1 described is a radial-flux, buried-permanent-magnet type, but the protective scope of the present disclosure also extends to any other type of permanent-magnet electric machine, such as radial-flux, surface-magnet, or axial-flux, or cross-flux electric machines. It should be further appreciated that the illustrated wind turbine is a direct-drive type (i.e., in which the hub and the electric machine rotor are connected directly).

The present disclosure obviously also covers embodiments not described in the above detailed disclosure, as well as equivalent embodiments within the protective scope of the accompanying Claims. That is, it should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A wind turbine electric machine comprising:
a stator; and
a rotor configured to rotate about an axis of rotation with respect to the stator, the rotor including:
a plurality of magnetized modules, and
a plurality of supports configured to support the magnetized modules and arranged about the axis of rotation, wherein at least two of the supports are electrically connected in parallel.

2. The wind turbine electric machine of claim 1, which includes an electric conducting structure electrically connecting, in parallel, at least two of the supports.

3. The wind turbine electric machine of claim 2, wherein each of the supports extends parallel to the axis of rotation from a first end to a second end.

4. The wind turbine electric machine of claim 3, wherein the electric conducting structure includes at least a first electric conductor and a second electric conductor electrically connecting, in parallel, at least two of the supports.

5. The wind turbine electric machine of claim 4, wherein the first electric conductor connects the first ends of the supports, and the second electric conductor connects the second ends of the supports.

6. The wind turbine of electric machine claim 2, wherein the electric conducting structure includes at least a first group of electric conducting elements and a second group of electric conducting elements electrically connecting, in parallel, at least two of the supports.

7. The wind turbine electric machine of claim 6, wherein each first group of electric conducting elements and each second group of electric conducting elements includes a plurality of third conducting elements and a plurality of fourth conducting elements, each third conducting element is connected to one of the supports, and each fourth conducting element is connected to two of the supports.

8. The wind turbine electric machine of claim 2, wherein each support includes a gripper extending parallel to the axis of rotation and the electric conducting structure is connected to the grippers to electrically connect the grippers in parallel.

9. The wind turbine electric machine of claim 2, wherein the electric conducting structure electrically connects, in parallel, each of the supports.

10. The wind turbine electric machine of claim 2, wherein the electric conducting structure is made of nonmagnetic material.

11. The wind turbine electric machine of claim 10, wherein the nonmagnetic material is selected from the group consisting of: stainless steel, aluminum, and copper.

12. The wind turbine electric machine of claim 2, wherein the electric conducting structure connects the supports to form a path for the electric charges on the supports.

13. The wind turbine electric machine of claim 2, which includes electrically conducting paste between the electric conducting structure and the supports.

14. The wind turbine electric machine of claim 1, wherein the stator includes a stator cylinder, the rotor includes a rotor cylinder concentric with the stator cylinder, and the plurality of supports are fixed to the rotor cylinder.

15. The wind turbine electric machine of claim 14, wherein the rotor cylinder is made of nonmagnetic material.

16. The wind turbine electric machine of claim 15, wherein the nonmagnetic material is selected from the group consisting of: stainless steel, aluminum, and a polymer material.

17. The wind turbine electric machine of claim 1, wherein the rotor includes a plurality of pairs of metal laminations and each lamination is fitted to at least one of the magnetized modules and configured to guide the flux of the magnetized module.

18. A wind turbine electric machine rotor configured to rotate about an axis of rotation with respect to a wind turbine stator, said wind turbine rotor comprising:
a plurality of magnetized modules, and
a plurality of supports configured to support the magnetized modules and arranged about the axis of rotation, wherein at least two of the supports are electrically connected in parallel.

19. The wind turbine electric machine rotor of claim 18, which includes an electric conducting structure electrically connecting, in parallel, at least two of the supports.

20. The wind turbine electric machine rotor of claim 19, wherein each of the supports extends parallel to the axis of rotation from a first end to a second end.

21. The wind turbine electric machine rotor of claim 19, wherein the electric conducting structure includes at least a first group of electric conducting elements and a second group of electric conducting elements electrically connecting, in parallel, at least two of the supports.

22. The wind turbine electric machine rotor of claim 19, wherein each support includes a gripper extending parallel to the axis of rotation and the electric conducting structure is connected to the grippers to electrically connect the grippers in parallel.

23. The wind turbine electric machine rotor of claim 19, wherein the electric conducting structure electrically connects, in parallel, each of the supports.

24. The wind turbine electric machine rotor of claim 19, wherein the electric conducting structure connects the supports to form a path for the electric charges on the supports.

25. The wind turbine electric machine rotor of claim 19, which includes electrically conducting paste between the electric conducting structure and the supports.

26. The wind turbine electric machine rotor of claim 18, wherein the rotor includes a plurality of pairs of metal laminations and each lamination is fitted to at least one of the magnetized modules and configured to guide the flux of the magnetized module.

* * * * *

UNITED STATES PATENT AND TRADEMARK OFFICE
CERTIFICATE OF CORRECTION

PATENT NO.        : 9,006,918 B2                                        Page 1 of 1
APPLICATION NO.   : 13/415603
DATED             : April 14, 2015
INVENTOR(S)       : Matteo Casazza, Otto Pabst and Alessandro Fasolo It is certified that error appears in the above-identified patent and that said Letters Patent is hereby corrected as shown below:

Title page, item (73) Assignee: should read:
Assignee: Wilic S.AR.L., Luxembourg (LU)

Signed and Sealed this
Ninth Day of February, 2016

Michelle K. Lee
*Director of the United States Patent and Trademark Office*